United States Patent [19]

Kranz

[11] Patent Number: 4,486,256
[45] Date of Patent: Dec. 4, 1984

[54] METHOD AND DEVICE FOR CONTINUOUSLY APPLYING A DECORATIVE STRIP TO A RUBBER PROFILE OR SECTION

[75] Inventor: Jürgen Kranz, Lindau, Fed. Rep. of Germany

[73] Assignee: Metzeler Kautschuk GmbH, Munich, Fed. Rep. of Germany

[21] Appl. No.: 529,027

[22] Filed: Sep. 2, 1983

[30] Foreign Application Priority Data

Sep. 2, 1982 [DE] Fed. Rep. of Germany ....... 3232700

[51] Int. Cl.$^3$ ............................................. B32B 31/18
[52] U.S. Cl. ..................................... 156/257; 52/716; 156/322; 156/324; 156/517; 156/549; 428/31; 428/67
[58] Field of Search ............... 156/257, 268, 250, 293, 156/516, 517, 324, 322, 549–551; 52/716; 428/31, 67

[56] References Cited

U.S. PATENT DOCUMENTS

| | | | |
|---|---|---|---|
| 2,842,028 | 7/1958 | Belgard | 156/293 X |
| 2,972,789 | 2/1961 | Mathues | 156/257 X |
| 3,477,485 | 10/1969 | Talbott | 156/268 X |
| 3,589,964 | 6/1971 | Wandel | 156/268 X |
| 3,998,679 | 12/1976 | Gwynne | 156/293 X |
| 4,368,225 | 1/1983 | Nussbaum | 428/31 |

Primary Examiner—David Simmons
Attorney, Agent, or Firm—Herbert L. Lerner; Laurence A. Greenberg

[57] ABSTRACT

This invention relates to a method and device for continuously applying a decorative strip to a rubber profile or section, especially for use in the automobile industry, wherein the decorative strip is inserted into a corresponding groove-shaped recess formed in the surface of the rubber profile or section.

9 Claims, 5 Drawing Figures

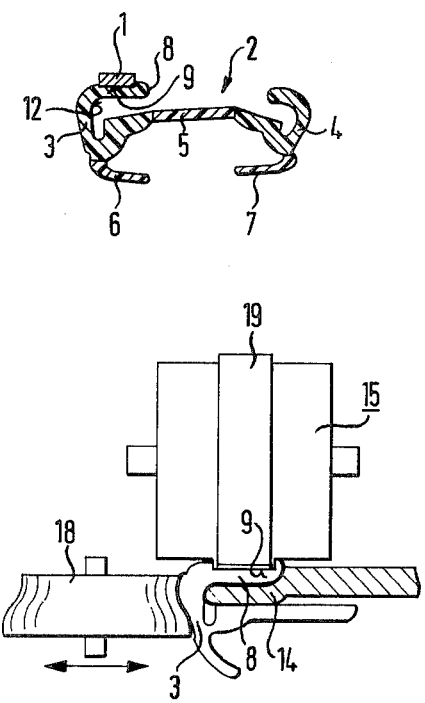
FIG. 1
FIG. 4
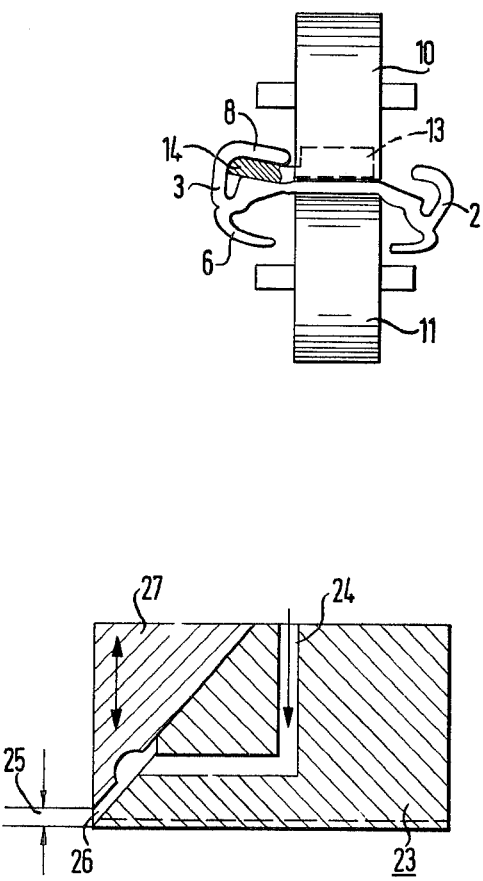
FIG. 3
FIG. 5

METHOD AND DEVICE FOR CONTINUOUSLY APPLYING A DECORATIVE STRIP TO A RUBBER PROFILE OR SECTION

The window-guide or channel-sealing profiles or sections used especially in the automobile industry are frequently provided at the outer visible side thereof with a decorative strip formed generally of plastic material with a silvery, shining surface. This decorative strip can be cemented afterwards to the profile molding, or it can be fitted into a corresponding groove of the profile or section. However it is more practical, however, for this decorative strip to be directly and permanently connected with the profile or section already when the profile or section is manufactured, especially if the profile sections are straight. However, if the profiles or sections, as viewed in cross-section, are formed of harder and softer rubber portions, and with several lips, and/or recesses, difficulties do arise, because these profiles are then relatively elastic and, because the decorative strip must be applied with given contact force, it becomes necessary to support the profile or section additionally and continuously in the region wherein the strip is to be applied.

Thus, it is a basic object of the invention to provide a method and a device for performing this method by which such a profile or section can be provided with a decorative strip in a continuous operation in relatively simple manner, so that the decorative strip is firmly, permanently and dimensionally accurately connected with the profile or section.

With the foregoing and other objects in view, there is provided, in accordance with the invention, a method for continuously applying a decorating strip to a rubber profile or section wherein the decorative strip is inserted into a corresponding groove-shaped recess formed in the surface of the rubber profile or section, which comprises (a) exactly and continuously guiding the rubber profile or section;

(b) milling the recess for the decorative strip into the surface of the rubber profile or section;

(c) continuously applying the adhesive into the recess; and (d) continuously feeding and pressing the decorative strip into the groove-shaped recess of the rubber profile or section.

In accordance with another mode of the invention, the method includes sucking up milling chips directly in front of and after the location at which the milling operation is performed.

In accordance with a further mode of the invention, the method includes preheating the rubber profile or section before the adhesive is applied.

In accordance with an added mode of the invention, the adhesive is a fusion adhesive.

In accordance with the device of the invention, there is provided a device for performing a method of continuously applying a decorative strip to a rubber profile or section comprising a continuous production line formed, in succession, with the following individual functional units:

(a) an insertion roller pair;

(b) a guide rail for the profile or section which engages in a recess formed in the profile or section;

(c) a laterally contacting guide and pressure roller;

(d) a profiling milling cutter;

(e) a hot air blower;

(f) an adhesive-applicating nozzle; and (g) a laminating device for the decorative strip.

In accordance with another feature of the invention, the profile or section guide rail is stationary and engages in a recess formed in the profile or section in a region wherein the groove is milled so as to function simultaneously also as a support for the profiling milling cutter introduced vertically from above.

In accordance with a further feature of the invention, the adhesive applying nozzle is formed as a wide-slit nozzle having a discharge slit with an adjustable width.

In accordance with an additional feature of the invention, the laminating device is formed of a pivotally supported pressure pad disposed directly above the profile or section, the decorative strip being feedable from above into a gap between a rounded lower edge of the pressure pad and the profile or section, the pressure pad being inclined to the profile or section and being supported at a location thereof forward of the center of gravity thereof and the decorative strip being pressed into the milled groove of the profile or section by the weight of the pressure pad.

In accordance with a concomitant feature of the invention, the laminating device includes a weight disposed in alignment with the longitudinal axis of the pressure pad, and slidable relative to the pressure pad.

Other features which are considered as characteristic for the invention are set forth in the appended claims.

Although the invention is illustrated and described herein as embodied in a method and device for continuously applying a decorative strip to a rubber profile or section, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a cross-sectional view of a finished ready-made profile;

FIG. 3 is a cross-sectional view of FIG. 2 taken along the line III—III in front of the first input rollers;

FIG. 4 is a cross-sectional view of FIG. 2 taken along the line IV—IV in the region of the milling-cutter;

FIG. 5 is an enlarged cross-sectional view of the nozzle according to FIG. 2 for applying adhesive.

Figure 2:
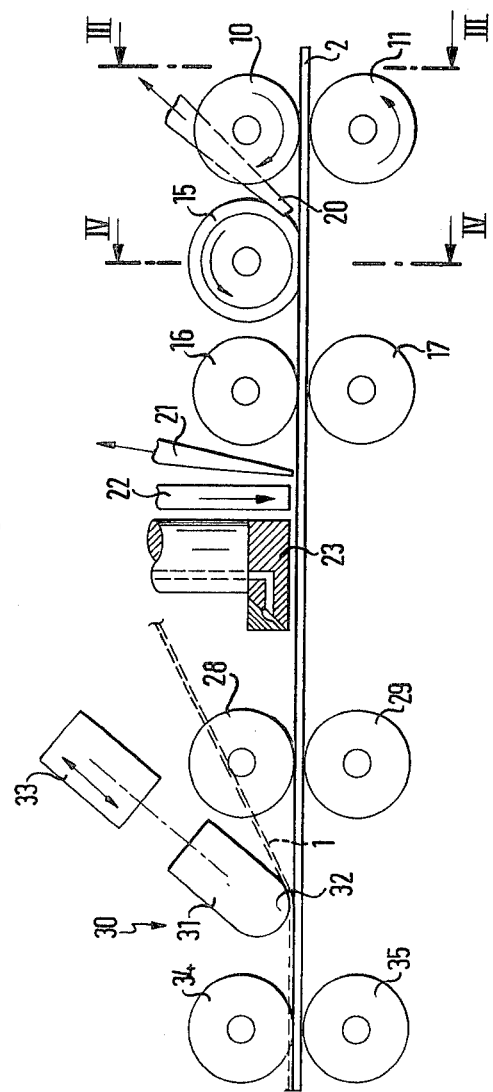
FIG. 2 is a diagrammatic side elevational view of the entire production line for performing the method according to the invention.

Referring now to the drawing and first particularly, to FIG. 1 thereof, there is shown a profile or section 2 to be ready-made with a decorative strip 1. The profiled part 2 is formed, for example, of two lateral substantially U-shaped profile regions 3 and 4 made of a leather-hard rubber, which are connected to one another by a flat profile region 5 formed of soft rubber. Additionally, at the lower outer edges of the section 2, two soft rubber lips 6 and 7 form part of the extrusion.

The upper leg 8 of the U-shaped profile region 3 is to be provided with a decorative strip 1, which is to be inserted into a corresponding groove 9 to be milled into the profile region 3.

To accomplish this task, in accordance with the invention, the following method steps and device parts are required, as is explained hereinafter in greater detail with respect to the production line shown diagrammatically in FIG. 2.

As illustrated in FIG. 2, the profile or section 2 is gripped by two knurled input rollers 10 and 11, and advanced towards the left-hand side of the figure. Following the input roller pair 10, 11, there begins a fixed guide rail 13 clearly shown in the crossectional view of FIG. 3 which carries a lateral flat projection 14. This projection 14 engages in a recess 12 formed in the U-shaped profile region 3 at the left-hand side of FIG. 3, so that the left-hand half of the profile or section 2 onto which the decorative strip 1 is to be applied is exactly and accurately guided and, especially, cannot be deflected downwardly. The pair of input roller 10 and 11 slides the profile or section 2 through and under the form milling cutter 15 until it is seized by transport rollers 16 and 17. The region of the form milling cutter 15 is more clearly shown in an enlarged view in FIG. 4. This sectional view also shown clearly that a spring-loaded pressure roller 18 is arranged laterally to the guide rail 14, and that this pressure roller 18 presses the profile region 3 firmly against the guide rail 14, thereby preventing the profile or section 2 from being laterally deflected. The actual milling section 19 of the form cutter 15 mills the groove 9 into the upper leg 8 of the profile or section 2, which then serves to receive the decorative strip 1. The milling chips are sucked away by a conventional suction device 20 shown only diagrammatically in FIG. 2.

An additional conventional suction device 21 following the transport-roller pair 16 and 17 cleans the groove 9 before cement or adhesive is applied thereto. A hot air blower 22 is disposed after the suction device 21 for pre-heating the groove 9 before the adhesive is applied.

A nozzle 23 for actually applying the adhesive is located after the preheating arrangement 22 and serves for applying a suitable cement or adhesive in the groove 9.

This adhesive-applying nozzle 23 is shown again in greater detail in FIG. 5. It is a so-called wide-slit nozzle having a channel 24 connected to a non-illustrated storage container for adhesive or cement which is provided with means for metering or dosing the adhesive. The width 25 of the slit provided in the nozzle opening 26 per se can be adjusted in accordance with the required amount of adhesive by vertically shifting the forward portion 27 of the nozzle 23 defining the nozzle opening 26 by sliding it accordingly.

After the adhesive is applied, the profile or section 2 is gripped by further tranport rollers 28 and 29 and fed to a doubling or laminating device 30 per se. This device 30 is only shown diagrammatically and is formed of an eccentrically and pivotally mounted pressure pad 31 with a rounded lower edge 32, the decorative strip, which can possibly be roller or uncoiled from a storage roller, being guided or fed into the adjustable gap located between the lower edge 32 and the profile or section 2, and then pressed into the groove 8 of the profile or section 2 by the pressure pad 31. For additional regulation of the pressure force of the inclined pressure pad 31, a weight 33 is provided which is aligned with the longitudinal axis of the pressure pad 31 and is slidable relative to the pressure pad 31.

After the doubling or laminating operation, the finished profile or section is gripped by another transport-roller pair 34 and 35, and then conducted to a non-illustrated deflection device.

The spaced distance of the adhesive-applying nozzle 23 from the laminating device 30 depends upon the type of adhesive used. If a fusion adhesive is used which is applied to the preheated groove 9, the laminating or doubling operation can be performed directly after the application of the adhesive, whereas if another type of adhesive is used which requires a longer setting time, a greater spaced distance must be chosen to attain a given extend of drying of the adhesive.

With the hereinafore-described method steps and device parts it is thus possible to connect a profile or section, which can basically have any shape, with an additional decorative strip firmly and permanently in a single operation and at one work station, while, especially, optimal dimensional accuracy is also assured.

The foregoing is a description corresponding, in substance, to German application No. P 32 32 700.5, dated Sept. 2, 1982, international priority of which is being claimed for the instant application, and which is hereby made part of this application. Any material discrepancies between the foregoing specification and the specification of the aforementioned corresponding German application are to be resolved in favor of the latter.

There are claimed:

1. Method for continuously applying a decorating strip to a rubber profile or section wherein the decorative strip is inserted into a corresponding groove-shaped recess formed in the surface of the rubber profile or section, which comprises
    (a) exactly and continuously guiding the rubber profile or section;
    (b) milling the recess for the decorative strip into the surface of the rubber profile or section;
    (c) continuously applying the adhesive into the recess; and
    (d) continuously feeding and pressing the decorative strip into the groove-shaped recess of the rubber profile or section.

2. Method according to claim 1, which includes sucking up milling chips directly in front of and after the location at which the milling operation is performed.

3. Method according to claim 1, which includes preheating the rubber profile or section before the adhesive is applied.

4. Method according to claim 1, wherein the adhesive is a fusion adhesive.

5. Device for performing a method of continuously applying a decorative strip to a rubber profile or section comprising a continuous production line formed, in succession, with the following individual functional units:
    (a) an insertion roller pair;
    (b) a guide rail for the profile or section which engages in a recess formed in the profile or section;
    (c) a laterally contacting guide and pressure roller;
    (d) a profiling milling cutter;
    (e) a hot air blower;
    (f) an adhesive-applicating nozzle; and
    (g) a laminating device for the decorative strip.

6. Device according to claim 5, wherein said profile or section guide rail is stationary and engages in a recess formed in the profile or section in a region wherein the groove is milled so as to function simultaneously also as a support for the profiling milling cutter introduced vertically from above.

7. Device according to claim 5, wherein said adhesive applying nozzle is formed as a wide-slit nozzle having a discharge slit with an adjustable width.

8. Device according to claim 5, wherein said laminating device is formed of a pivotally supported pressure pad disposed directly above the profile or section, the decorative strip being feedable from above into a gap between a rounded lower edge of the pressure pad and the profile or section, the pressure pad being inclined to the profile or section and being supported at a location thereof forward of the center of gravity thereof and the decorative strip being pressed into the milled groove of said profile or section by the weight of said pressure pad.

9. Device according to claim 8, wherein said laminating device includes a weight disposed in alignment with the longitudinal axis of said pressure pad, and slidable relative to the pressure pad.

* * * * *